United States Patent
Ansari et al.

(10) Patent No.: US 10,225,848 B2
(45) Date of Patent: Mar. 5, 2019

(54) DATA STREAMS WITH DIFFERENT PRIORITIES IN CONTENTION-BASED SYSTEMS

(71) Applicant: Telefonaktiebolaget LM Ericsson (publ), Stockholm (SE)

(72) Inventors: Junaid Ansari, Aachen (DE); Ismet Aktas, Aachen (DE); Shehzad Ali Ashraf, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/043,342

(22) Filed: Jul. 24, 2018

(65) Prior Publication Data

US 2018/0332598 A1    Nov. 15, 2018

Related U.S. Application Data

(63) Continuation of application No. 15/100,827, filed as application No. PCT/EP2015/068866 on Aug. 17, 2015, now Pat. No. 10,051,647.

(51) Int. Cl.
*H04W 72/10* (2009.01)
*H04W 74/08* (2009.01)
*H04W 72/04* (2009.01)

(52) U.S. Cl.
CPC ....... *H04W 72/10* (2013.01); *H04W 72/0446* (2013.01); *H04W 74/0816* (2013.01)

(58) Field of Classification Search
CPC .......................... H04W 72/10; H04W 72/0446
See application file for complete search history.

(56) References Cited

U.S. PATENT DOCUMENTS

| 2011/0255618 | A1 | 10/2011 | Zhu et al. |
| 2014/0079046 | A1 | 3/2014 | Yang et al. |
| 2016/0366689 | A1* | 12/2016 | Zhang .................. H04L 5/0091 |

OTHER PUBLICATIONS

Invitation to Pay Additional Fees and, Where Applicable, Protest Fee, including Communication Relating to the Results of the Partial International Search, International Application No. PCT/EP2015/068866, dated Apr. 28, 2016.

(Continued)

*Primary Examiner* — Ian N Moore
*Assistant Examiner* — Latresa A McCallum
(74) *Attorney, Agent, or Firm* — Sage Patent Group

(57) ABSTRACT

A method by a communication device accessing a shared communication channel using a contention based access protocol. The device is configured to transmit data streams with different transmission priorities via the shared communication channel with a first data stream having a higher transmission priority than a second data stream. A method includes observing whether the shared communication channel is available for transmission, where when the channel is available, and the device waits for the duration of a time interval randomly selected from a time range in which the shared communication channel is available for transmission before the transmission is started. A first time interval is selected from a first time range for the transmission of the first data stream, and a second time interval is selected from a second time range, that does not overlap with the first time range, for the transmission of the second data stream.

12 Claims, 7 Drawing Sheets

(56) References Cited

OTHER PUBLICATIONS

IEEE Computer Society, "IEEE Standard for Information Technology—Telecommunications and Information exchange between systems—Local and metropolitan area networks—Specific Requirements—Part 11: Wireless LAN Medium Access Control (MAC) and Physical Layer (PHY) specifications: High Speed Physical Layer in the 5 GHz Band", IEEE Standard 802.11™ -2012 (Revision of IEEE Std 802.11-2007,Mar. 29, 2012, 2793 pp.

IEEE Computer Society, "IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 8: Medium Access Control (MAC) Quality of Service Enhancements", IEEE Std 802.11e™ -2005, Nov. 11, 2005, 211 pp.

International Search Report and Written Opinion of the International Searching Authority, Application No. PCT/EP2015/068866, dated Jul. 12, 2016.

Gannoune et al., "Dynamic Tuning of the Contention Window Minimum ($CW_{MIN}$) for Enhanced Service Differentiation in IEEE 802.11 Wireless Ad-Hoc Networks", *15th IEEE International Symposium on Personal, Indoor and Mobile Radio Communications (PIMRC 2004)*, Sep. 5-8, 2004, pp. 311-317.

Mishra et al., "A Contention Window Based Differentiation Mechanism for providing QoS in Wireless LANs", *9$^{th}$ International Conference on Information Technology (ICIT '06)*, Dec. 18-21, 2006, 5 pp.

Ning et al., "A New Adaptive EDCA Scheme for Improving the Performance of IEEE 802.11s Network", *2012 Spring Congress on Engineering and Technology (S-CET)*, May 27-30, 2012, 4 pp.

Sarma et al., "A Strict Priority Based QoS-Aware MAC Protocol for Mobile Ad Hoc Networks", *Distributed Computing and Internet Technology*, LNCS vol. 5375, Dec. 10, 2008, pp. 121-132.

\* cited by examiner

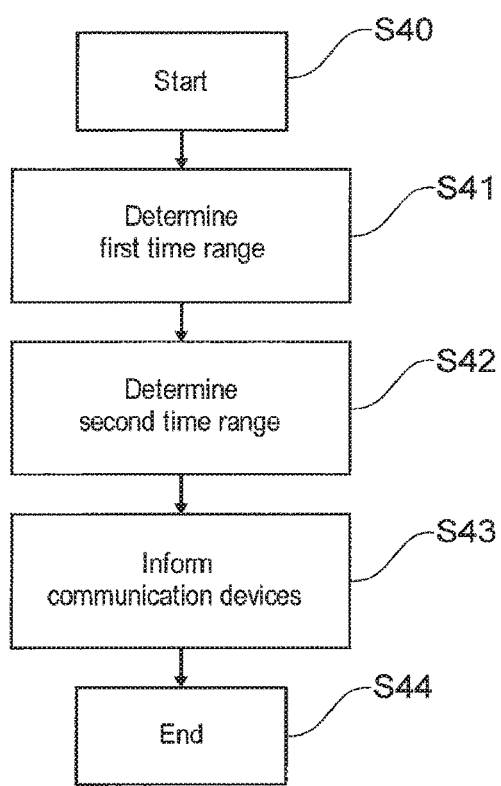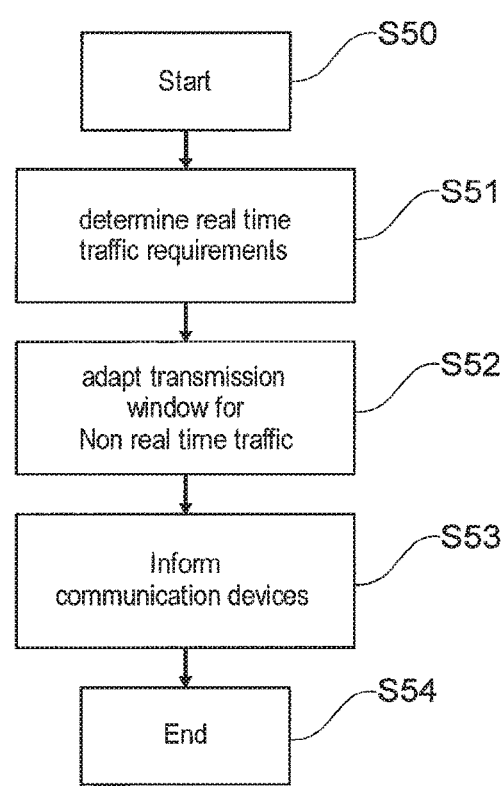

DATA STREAMS WITH DIFFERENT PRIORITIES IN CONTENTION-BASED SYSTEMS

CROSS REFERENCE TO RELATED APPLICATIONS

This application is continuation of U.S. patent application Ser. No. 15/100,827, filed on Jun. 1, 2016, which is a 35 U.S.C. § 371 national stage application of PCT International Application No. PCT/EP2015/068866, filed on Aug. 17, 2015, the disclosure and content of both of which is incorporated by reference herein in its entirety.

TECHNICAL FIELD

The present invention relates to a method for accessing a shared communication channel in which contention-based access to the communication channel is used and to the corresponding communication device. The invention furthermore relates to a method for coordinating an access of a plurality of communication devices to the shared communication channel by a control node. Furthermore, a system comprising a communication device and the control node, a computer program and a carrier is provided.

BACKGROUND

The user evolution of wireless technologies has dramatically changed the way the user communicate and interact with their environment. The next generation of radio communications system, i.e. the fifth generation (5G) takes it even one step further by connecting not only individuals but also all sorts of devices and machines. One main objective of a 5G radio concept is to support highly reliable ultra-low delay machine-type communication (MTC), i.e. Critical-MTC. The Critical-MTC and wireless industrial automation concepts need to address the design trade-offs mainly between end-to-end latency and transmission reliability, and provide solutions for wireless networks suiting to different industrial application use cases. In almost all the Critical-MTC deployments, two distinct traffic patterns need to coexist, which include realtime and non-realtime traffic. The realtime traffic includes e.g. industrial control messages, alarms, alert messages, etc. while the non-realtime traffic mainly comprises software updates, transmission of log dumps etc. The wireless industrial automation system is needed to carry out radio resource management and govern channel access so as to ensure that realtime traffic requirements are fulfilled. Realtime traffic has the peculiarity that the message size is small, while non-realtime traffic typically consists of large data size. Realtime traffic could be periodic as well as sporadic. In wireless industrial automation systems such as Critical-MTC systems, the traffic patterns from different nodes are typically different and vary over time depending upon the application requirements and network dynamics. Traffic patterns on the same node can also be very different.

In many wireless industrial automation scenarios, schedule-based channel access schemes are currently used according to which channel resources are pre-allocated to all nodes (or communication links) in the network. In general, such pre-scheduled systems are overprovisioned and hence lead to resource (i.e., frequency and/or time) wastage when there is less traffic load. This inefficiency of resource utilization becomes increasingly alarming especially when the traffic patterns are unpredictable and varying. While most of the alarms and alert messages with realtime requirements cannot be predicted beforehand and are sporadic in nature, over-provisioning of resources results in precious bandwidth wastage in schedule-based channel access schemes. Furthermore, the need for pre-allocation or resources in schedule-based systems according to the network size, i.e. the number of nodes associated with a particular central node, tend to show a natural limitation in environments where the network size varies over time.

In contrast to schedule-based systems, contention-based systems in general suit better to dynamics in traffic patterns and network size variations. However, contention-based systems suffer from inability to assure traffic reliability guarantees in deterministic time scales especially with increasing system load or congestion in the network. In higher traffic load conditions and when multiple contenders attempt to access the medium, packet collisions may happen. Many contention-based systems like, for instance, Wi-Fi exercises a contention resolution mechanism through back-off algorithms to relieve contention situations and reduce packet collisions. Contention resolution schemes such as the one used by Wi-Fi systems increase latency for queued packet transmission and this becomes highly critical for realtime traffic.

Having the same access priority to the medium for both realtime and non-realtime traffic is naturally unfair for realtime traffic having strict timing deadlines. In WI-FI (particularly IEEE 802.11e), traffic access categories (AC) are used to prioritize certain types of packets over others. However, it is well known that despite using different service classes for channel access prioritization, Wi-Fi systems show acute disadvantage for VoIP traffic (with strict timing deadlines) when mixed traffic (VoIP, best effort, video, etc.) exist simultaneously in a network in the same shared medium.

Also, when large data is to be transmitted (i.e. MAC SDU (Medium Access Layer Service Data Unit) is larger than the maximum allowed frame size), Wi-Fi system splits it into smaller fragments and transmits them individually. Wi-Fi does not govern any prioritization for the transmission of fragments belonging to the same large data packet appearing over fragments of another large data packet generated at a later point of time. This leads to unfair channel access for traffic scheduled to be transmitted earlier especially when the traffic load is high.

SUMMARY

Accordingly, a need exists to improve the transmission of data streams having different transmission priorities in a shared communication channel in which a contention based access to the communication channel is used.

This need is met by the features of the independent claims. Further aspects are described in the dependent claims.

According to one aspect, a method for accessing a shared communication channel by a communication device is provided in which contention-based access to the communication channel is used wherein the communication device is configured to transmit data streams with different transmission priorities via the shared communication channel with a first data stream having a higher transmission priority than a second data stream. The communication device observes whether the shared communication channel is available for transmission, wherein when the shared communication channel is not available for transmission, the communication device waits for the duration of a time interval randomly selected from a time range in which the shared communication channel is available for transmission before the transmission is started. A first time interval is selected from a first time range for the transmission of the first data stream and a second time interval is selected from a second time range for the transmission of a second data stream wherein the second time range does not overlap with the first time range.

As non-overlapping time ranges are used a better differentiation between the first data stream with a higher priority compared to the second data stream is possible. With the selection of different time ranges, the starting of the transmission of data can be selected in dependence on the priority. Preferably the first time range is defined by a first minimum value and a first maximum value and the second time range is defined by a second minimum value and a second maximum value, wherein the first maximum value is smaller than the second minimum value.

As the first time interval selected from the first time range is necessarily shorter than the second time interval selected from the second time range, the longest first time interval is shorter than the shortest second time interval. Thus, a communication device transmitting a first data stream with a higher priority starts earlier to transmit the data compared to a communication device waiting a second time interval before starting the transmission of a second data stream with a lower priority. As a consequence, the first data stream with the higher priority will be transmitted earlier than a second data stream when the transmission is initiated at the same time. When the shared communication channel is busy, the communication device transmitting the first data stream accesses the shared communication channel earlier after detecting that the communication channel is available for transmission compared to a communication device transmitting a second data stream.

Furthermore, the corresponding communication device is provided comprising an interface configured to transmit the different data streams and comprising at least one processing unit which selects the first time interval from the first time range and the second time interval from the second time range as mentioned above.

According to another aspect, a method for coordinating an access of a plurality of communication devices to the shared communication channel by a control node is provided wherein a contention based access to the communication channel is used by the plurality of communication devices, wherein the communication devices are configured to transmit data streams with different transmission priorities via the shared communication channel with the first data stream having a higher transmission priority than the second data stream. Each of the communication devices observes whether the shared communication channel is available for transmission and when the communication channel is not available for transmission each communication device waits for a duration of a time interval randomly selected from a time range in which the shared communication channel is available for transmission before the transmission is started. According to one step of the method, the control node determines the first time range from which each of the communication devices selects the time interval for the transmission of the first data stream and determines the second time interval from which each of the communication devices selects the time interval for the transmission of the second data stream. The second time range is determined such that the second time range does not overlap with the first time range. Additionally, the plurality of communication devices are informed about the first time range and the second time range.

When the different communication devices connected to the control node use the first time range for the first data streams and the second time range for the second data streams, data streams with higher priority can be transmitted more effectively. The invention furthermore relates to the corresponding control node including at least one processing unit configured to determine the first time range and the second time range as described above and comprising an interface configured to inform the plurality of communication devices about the first time range and the second time range.

According to another aspect, a method for coordinating an access of a plurality of communication devices to a shared communication channel by a control node is provided in which contention based access to the communication channel is used wherein the plurality of communication devices are configured to transmit data streams with different transmission priorities via the shared communication channel with a first data stream having a higher transmission priority than a second data stream. The control node determines data stream requirements of least one first data stream to be transmitted over the shared communication channel by one of the plurality of communication devices. Additionally, it grants access to the shared communication channel for a time period of a transmission window to the plurality of communication devices wherein a second time period of the transmission window for communication devices transmitting second data streams is adapted based on the requirements of the at least one first data stream. Additionally, the adapted second time period of the transmission window is transmitted to the communication devices.

As the transmission window represents the maximum transmission time for the corresponding data stream the control node adapts the transmission window for the data streams with a lower priority based on the data stream requirements of the data streams with the higher priority. By way of example, when it is detected that a first data stream having a very strict timing requirement should be transmitted over the shared communication channel, the control node may adapt the second time period of the second transmission window accordingly, e.g. it may decrease the size of the transmission window so that a communication device transmitting a data stream with a lower priority occupies the shared communication channel for a shorter period of time and that the realtime requirements of any emerging first data stream can be ensured.

The invention furthermore relates to the control node as mentioned above.

Furthermore, a system is provided comprising a communication device and a control node as discussed above.

According to another aspect, a computer program comprising a program code to be executed by at least one processing unit of a communication device or a control node is provided wherein an execution of the program code causes the at least one processing unit to execute a method as described above or in more detail below. Furthermore, a carrier comprising the computer program is provided.

It is to be understood that the features mentioned above or features yet to be explained below can be used not only in the respective combinations indicated, but also in other combinations or isolation without departing from the scope of the present application. The features of the above mentioned aspect embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numbers refer to like elements.

FIG. 4 shows an example of a flowchart comprising the steps carried out by a control node of FIG. 1 for determining time ranges which are used as a basis for the selection of a time interval for the transmission of data streams with different priorities.

FIG. 5 shows an example of a flowchart including steps carried out at a control node which adapts the transmission window for traffic with a lower priority based on the traffic requirements of a data traffic with a higher priority.

DETAILED DESCRIPTION OF EMBODIMENTS

Figure 1:
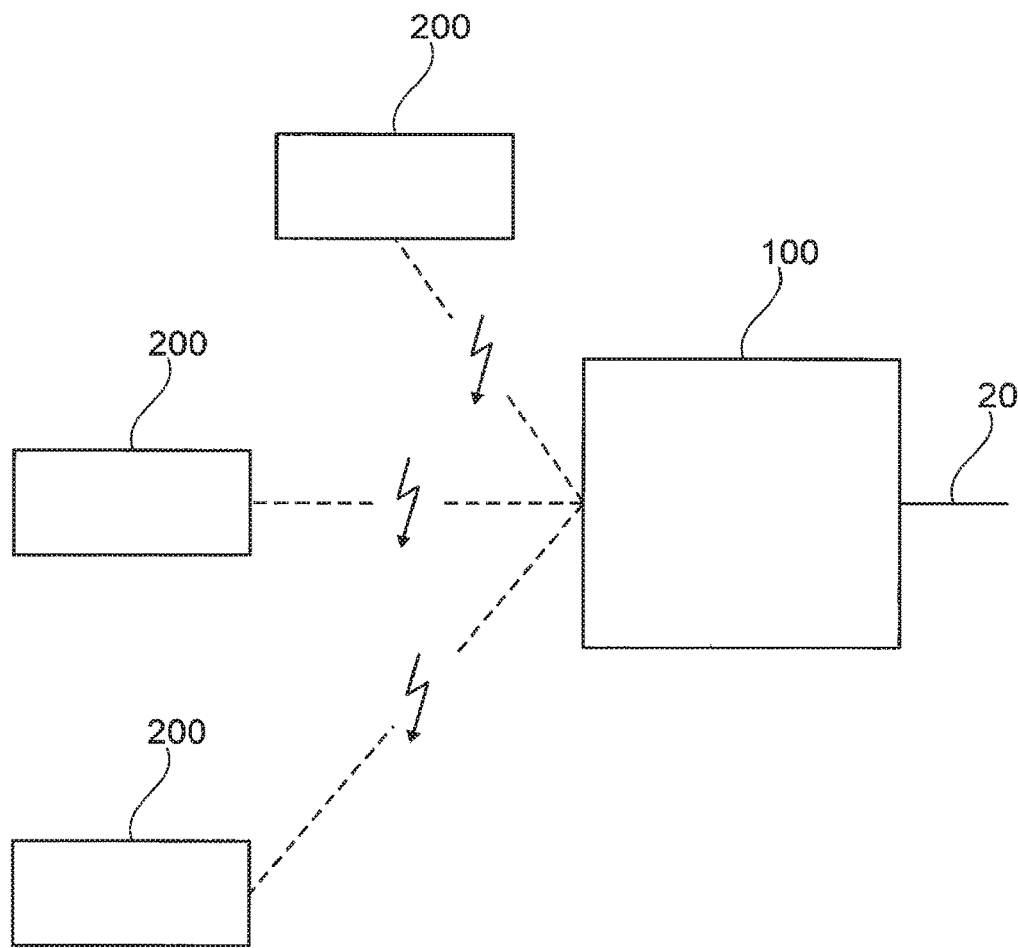
FIG. 1 shows an example view of a situation in which a plurality of communication devices use a shared communication channel of a control node using contention based access to the communication channel.

In the following, embodiments of the invention will be described in detail with reference to the accompanying drawings. It is to be understood that the following description of embodiments is not to be taken in a limiting sense. The scope of the invention is not intended to be limited by the embodiments described hereafter or by the drawings which are to be taken demonstratively only.

The drawings are to be regarded as being representations and elements illustrated in the drawings are not necessarily shown to scale. Rather, the various elements are represented such that their function and a general purpose become apparent to a person skilled in the art. Any connection or coupling between functional blocks, devices, components or physical functional units shown in the drawings or described herein may be implemented by an indirect connection or coupling. A coupling between components may be established over a wired or wireless connection. Furthermore, functional blocks may be implemented in hardware, software, firmware, or a combination thereof.

The present invention supports a first data stream having a higher transmission priority coexisting with a second data stream having a low priority. The higher priority data stream can be a realtime data stream whereas the second data stream can be a non-realtime data stream or traffic. It should be understood that not only two different priority classes may exist. By way of example, realtime traffic may exist and multiple different priority classes for non-realtime data streams.

The method described below inter alia carries out a channel access priority management based on traffic types.

In the following reference will be inter alia made to communication devices. The communication device may be any type of communication device, such as a machine type communication device also named "industrial IoT devices" e.g. a meter, or a digital billboard or a mobile phone, a portable computer, a laptop, a smart television screen, a tethering access point node, a vehicle such as a car implementing communication functionality.

As disclosed in connection with FIG. 1, the invention is used in an environment in which a plurality of communication devices 200 access a shared communication channel 50 provided and controlled by a control node 100. Unlike current data systems the present application specifies both the lower and the upper limit of the current contention window for both realtime and non-realtime traffics. Furthermore the invention guarantees smaller contention window counter selection for realtime traffic.

According to a further aspect, the maximum transmission time for a non-realtime traffic is also controlled based on latency budget or data stream requirements of the realtime traffic in the network. The maximum transmission time can either be pre-configured or adapted at run time. Especially, the latter case allows a performance enhancement for non-realtime traffic, depending upon the dynamics in the system (changing application requirements and network conditions).

According to a third aspect, the probability of channel access is increased for data fragments belonging to the same data packet or MAC SDU as compared to newer non-realtime data streams. This can be achieved inter alia by decreasing the current window limits for fragments belonging to the same data packet or MAC SDU.

Figure 2:
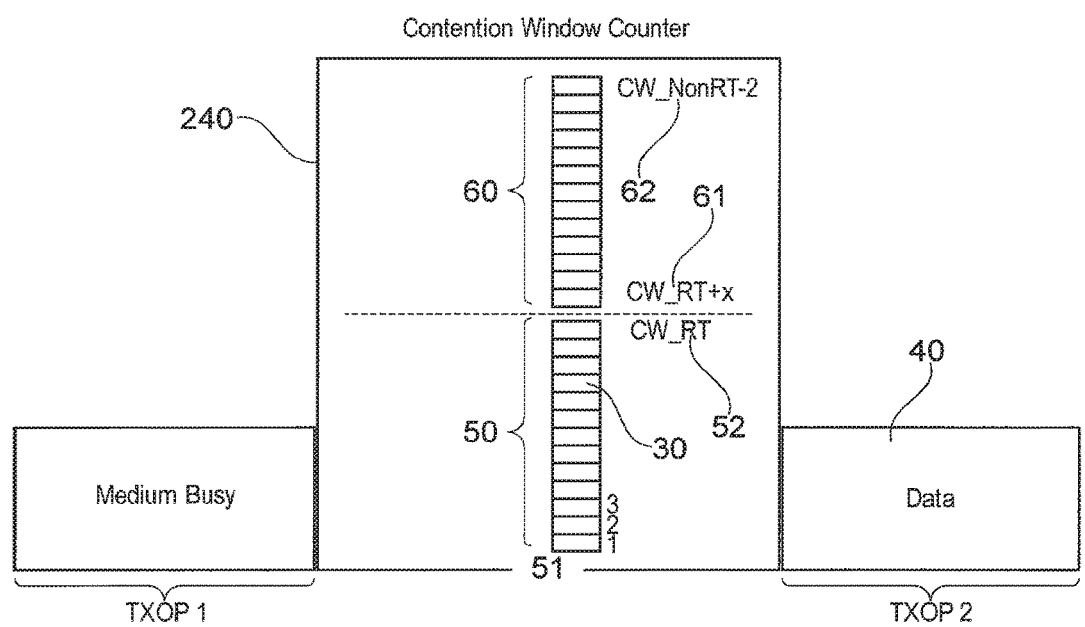
FIG. 2 shows an example illustration of a system including a contention window counter selecting different time intervals for a realtime and a non-realtime traffic.

Referring back to FIG. 1, before the shared communication channel 20 can be accessed each of the communication devices 200 is required to perform a listen-before-talk (LBT) procedure where a node senses the medium and performs a clear channel assessment (CCA). Only if the shared communication channel is found free, a corresponding communication device carries out the transmission. If multiple communication devices 200 simultaneously attempt packet transmissions after detecting the medium free, packets collide and hence the intended receivers are unable to decode the transmitted packets of the data packet stream. In order to avoid the situation each communication device transmitter selects randomly (with uniform distribution) a contention window counter which determines the number of time slots that the communication device has to wait before accessing the communication channel. This is shown in further detail in FIG. 2, where the shared communication channel transmission windows are shown as transmission opportunities (TXOP) wherein the transmission window is a bounded time interval in which one of the communication devices is permitted to transfer its data. As indicated in FIG. 2 the shared communication channel is occupied by one of the communication devices in the transmission window shown on the left side, TXOP1. Then when the communication channel is detected as being free, a contention window counter within a communication device is started which determines the number of time slots that the communication device has to wait before accessing the medium.

As shown, a contention window counter 240 uses time slots 30 as time units. For each slot 30, the communication device senses the medium. If the medium is sensed as being free, the counter 240 is decremented. If a slot is detected as being busy, the counter is not decremented. As can be seen from FIG. 2, the different communication devices now use a first contention window for traffic of a higher priority in another contention window for traffic of a lower priority. By way of example a communication device transmitting a data stream of a higher priority, e.g. a first data stream such as a realtime data stream checks for first time interval whether the shared communication channel is free wherein this first time interval is selected from a first time range 50 whereas for the transmission of a non-realtime data or data stream of a lower priority a time interval is selected from a second time range 60. As can be deduced from FIG. 2, the first time range 50 and the second time range 60 do not overlap. This means that the first time range 50 is defined by a first minimum value 51 and a first maximum value 52 which is indicated in FIG. 2 as a contention window for realtime traffic CW_RT. The second time range is defined by a second minimum value 61 and a second maximum value 62. The first time range 50 is between [0, CW_RT], whereas the second time range is between [CW_RT+x,CW_nonRT−z]. The second time range is for the non-realtime traffic whereas the first time range is for the realtime traffic. [CW_RT] and [CW_nonRT] are the current contention window upper limits for realtime and non-realtime traffic respectively, x and z are integers in the range [1, CW_RT] and are described in further detail below.

As can be deduced from the above, the second time range does not overlap with the first time range so that the communication device uses a contention window counter for a realtime traffic that is always smaller than the contention window counter for the non-realtime traffic. This allows a higher priority to the realtime data streams. A small value of a contention window counter allows a communication device to access the medium quickly as only a small number of slots has to be counted down before traffic is transmitted when the shared communication channel is free. As mentioned above, the first time range and the second time range are separated by a certain number of slots x with x being integer being greater or equal than 1. This guard slot interval or these guard slots are provided to increase the flexibility to assign slots either to the realtime or non-realtime data stream counter in dependence on the needs. The number of guard slots x can be used/reconfigured to keep the non-realtime traffic even at a lower priority (by lowering its access probability) so as to relieve potential contention in the medium for realtime traffic. If there is little contention for realtime traffic in the medium, the number of guard slots can be reduced. Furthermore, they assure the two time ranges 50 and 60 do not overlap. A number of guard slots assures that a communication device transmitting non-realtime traffic has to wait for at least x slots longer before getting access to the shared communication channel than the realtime traffic.

Secondly, the guard slots can be used for the following aspect. The minimum limit of the contention window for non-realtime traffic, thus the minimum value of the contention window counter can be configured based on the perceived or assessed contention levels for realtime traffic demands. If there is a high contention encountered or perceived for realtime traffic the minimum second value 61 can be increased so that the non-realtime traffic has a lower effect on the contention levels in the shared communication channel. When the minimum second value is increased, each communication device has to wait longer before accessing the shared communication channel and before the transmission of data is started. In a transmission window the x guard slots between the first maximum value 52 and the second minimum value 61 furthermore help in the following situation. When an unsuccessful transmission is detected by one of the communication devices for the transmission of a data packet, e.g. when an acknowledgement has not been received, the first maximum value of the first time range can be increased for the first data stream and the second maximum value can be increased for the second data stream.

According to one aspect of the invention, in case of a unsuccessful transmission, the current contention window upper limit, thus the second maximum value 62 may be doubled for the non-realtime data streams whereas the first maximum value 52 for realtime traffic may be only incremented by one time slot. This increment of the contention window upper limit continues after each unsuccessful transmission till the maximum limit corresponding to a traffic type is reached The maximum value for the upper limit of the current contention window counter is increased (doubled for nonRT traffic, incremented by 1 for RT traffic) till the corresponding maximum possible limits are reached. The maximum possible upper limits for realtime and non-realtime traffic are different. Essentially, z is used to give different priority levels to different MPDUs for a given transmission, i.e., higher priority is given to following fragments of the same data stream.

Due to the provided guard slots a communication device can increase the upper limit 52 by one time slot without having an overlap between the first time range 50 and the second time range 60. When a communication device succeeds in the transmission without encountering a collision or an unsuccessful transmission, it resets the current contention window limits back to the initial values corresponding to the traffic type The initial values could be selected in different ways. They could be set flexibly at the boot-up time depending upon the perceived traffic characteristics, communication data rates (transceiver capabilities) and deployment setup besides any expert insights/inputs into the system/application/deployment-setup. Unlike WI-FI, these values are not restricted to be pre-configured or fixed In the following, another aspect is described in connection with FIG. 2. Unlike realtime data which is normally very small in size, such as data transmitting an alarm or automation control or command messages, non-realtime data can be large, e.g. a software update, status messages, etc. Thus, the non-realtime data streams take a long air-time and potentially delays any waiting of realtime traffic beyond the acceptable bounds. In order to avoid the situation, it is proposed to shorten the maximum transmit opportunity TXOP for the non-realtime traffic according to the latency margin of realtime data streams in the system. The TXOP can be adapted during the operation of a network.

Having a short TXOP can allow the medium to be accessed or utilized for emerging realtime traffic. Furthermore, the TXOP duration for a non-realtime traffic can be reconfigured at run time according to the strict application requirements in the network, e.g. for a realtime traffic. As it will be discussed in further detail below the TXOP is selected in the system. By reconfiguring the TXOP and the contention window for different traffic types, the system performance of both realtime and non-realtime traffic can be optimized. Having a flexibly configured TXOP for non-realtime traffic also optimizes the non-realtime traffic performance compared to a situation when a fixed or preconfigured TXOP is used.

The maximum transmit opportunity TXOP, as shown in FIG. 2 can be configured adaptively based on the realtime traffic requirements. A communication device 200 shown in FIG. 1. indicates the type of services and network conditions it experiences to the control node 100 so that the TXOP value can be appropriately adapted. All the communication devices associated to a particular access point or control node need to readjust the TXOP when for instance a communication device with even tighter timing deadlines joins the network or on the contrary when the node with the most stringent timing requirements leaves the network. It is to be noted that here the expression "node" also means its service requirements, i.e. the traffic requirement or application data requirement.

A new traffic requirement with most stringent timing deadlines could be started/removed from a particular node or another node joins/leaves the network with such traffic requirement. In the former case, the topology of the network remains the same but "service" Is altered whereas in the latter case, the topology of the network is modified.

The above would also hold true even when a new service with the most strict timing deadlines is introduced or disabled in a given network. The selection of TXOP duration can be carried out at the system initialization or can as well be updated during the course of operation. When the system is running only the communication device having an update of service requirements with most strict timing deadlines needs to indicate it to the access point or control node so that the new TXOP duration is sent out to all the associated communication devices accordingly.

Furthermore, it should be noted that the contention window limits, the first minimum value and the first maximum value 51, 52 or the second minimum value 61 and the second maximum value 62 both for realtime and non-realtime traffic can be selected at the initialization phase as well as can be adapted flexibly and depending on the traffic requirements for the realtime and non-realtime traffic.

Different data streams, the first data stream having a higher transmission priority or the 25 second data stream having a lower transmission priority transmit data packets in fragments. If the different layers are considered an SDU (Service Data Unit) is transmitted using PDUs (Protocol Data Unit). When a communication device has transmitted only part of its data stream, especially a non-realtime data stream due to an imposed restriction due to TXOP, the maximum contention window limit, the second maximum value 62 or even the first maximum value 52 can be reduced so that the probability of grabbing the medium is increased over an entirely new non-realtime traffic of the same class contending for the medium.

This means that subsequent fragments of the same non-realtime data have a higher priority than earlier fragments. The higher the fragment number belonging to the same data is, the higher there will be the probability to access the channel. When the maximum value of the corresponding time range is reduced, a corresponding node will have a shorter waiting time before accessing the channel compared to a communication device in which the maximum value is not decreased. It should be understood that realtime traffic still has a faster channel access than fragments of a non-realtime traffic.

Concerning the size of the maximum transmission time, the following is noted. The transmission and reception (TX/RX) turnaround time is very small on modern radio communication networks, so that the maximum affordable total latency for realtime traffic (t_RT) governs an upper bound given by $$t\_RT > (2*TXOP + t\_RTBOmax),$$

t_RTBOmax is the maximum backoff for realtime traffic, and which is CW_RT*t_cca, where t_cca is the time required for performing clear channel assessment. Furthermore, it should be noted that in this bound, it is assumed that the maximum air time for realtime traffic is the same as for non-realtime traffic. In reality the maximum time for transmitting a realtime packet is typically much smaller than the total allowed transmission opportunity.

The different aspects shown in FIG. 2 can be summarized as follows: the number of time slots assigned to realtime and non-realtime traffic can be flexibly configured and a non-overlapping range is used for the contention window counter of realtime and non-realtime traffic. As the first range 50 is lower than the second range a higher priority is granted to communication devices with realtime traffic. Furthermore, a higher priority is granted to communication devices which have only transmitted parts of the data packet by decreasing the maximum value 62. Furthermore, the maximum transmission opportunity can be flexibly configured depending on the realtime traffic requirements. Furthermore, the guard interval helps to assure that even with adapted upper and lower values 61 and 52 a non-overlapping range is maintained.

Figure 3:
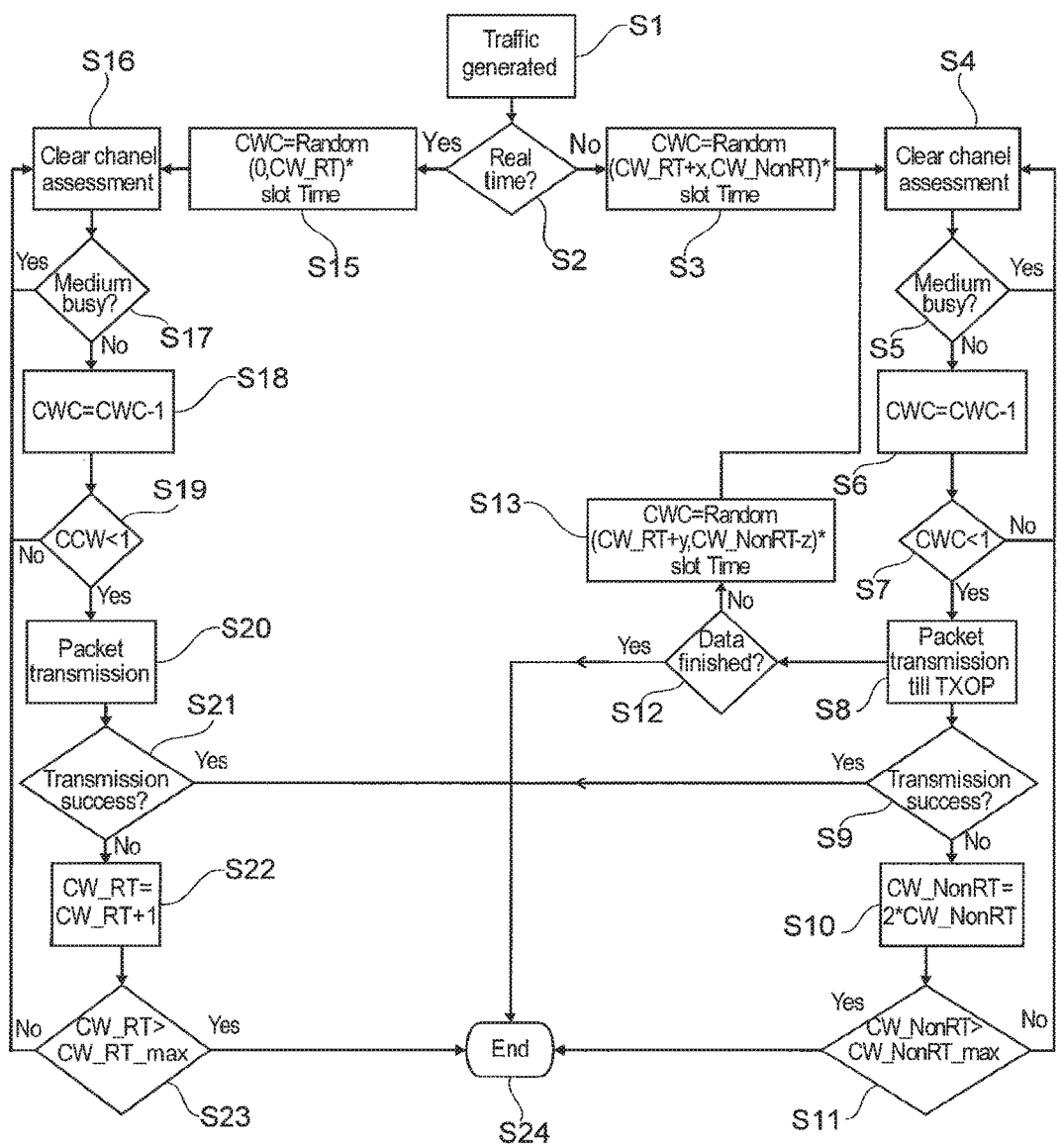
FIG. 3 illustrates an example flowchart of a method carried out by a communication device for transmitting data streams through a contention based access to the communication channel for a traffic of different priorities.

FIG. 3 shows an example flowchart of a communication device transmitting a data packet stream. In step S 1, the data stream is generated while in step S 2 it is asked whether it is a realtime traffic. First of all we will discuss the case of a non-realtime traffic. As it is a non-realtime traffic the time interval is selected from the second time range meaning that the random number of time slots is selected from the second range 60 (step S 3). In the following a clear channel assessment is carried out in step S 4 wherein it is checked whether the channel is free for the transmission or not. In this context it is asked in step S 5 whether the medium is busy. If yes, the clear channel assessment is continued until the communication device determines that the communication channel is free for transmission. Thus, if the medium is not busy, the counter is counted down in step S 6, one time slot and it is determined in step S 7 whether it has arrived at the value smaller than 1. If not, it returns to step S 4 of the clear channel assessment. When the communication device has finally determined that the channel is free for all the time slots so that the counter has counted down to 0 the data packet is transmitted until the maximum allowable transmission time TXOP in step S 8. If the transmission was not successful, the maximum value of the second time range is doubled in step S 10. Furthermore, it is checked whether the upper limit of the current contention window for non-realtime traffic is larger than the maximum value (step S 11). If this is not the case, the system will return to step S 4. In step S 8, it is furthermore checked whether all the data has been transmitted (step S 12), if this not the case, again a time interval is randomly selected from the second time range. As can be deduced from step S 13, the maximum value of the second time range is reduced by the value Z so that fragments of the same data packet are transmitted with a higher priority as the second time range in step S 13 is smaller than in step S 3. When the TXOP does not suffice for the originally generated data stream in S 3, it requires a subsequent transmission in S 13.

The number of slots z gives a higher priority to the data fragment in the second transmission attempt in S 13 compared to S 3. The value of z increases in subsequent transmissions of the same data as different TXOP-limited fragments.

The value of y and x can be the same in most of the perceivable cases. However, these could be different depending upon the guard slots needed at a particular instant dictated by the current contention level in the medium.

Referring back to step S 2, if there is realtime data traffic, the time interval is selected for the second counter from the first time interval (50) in step S 15. In steps S 16 and S 17, the clear channel assessment is carried out in accordance with steps S 4 and S 5 and the counter counts down in step S 18 as in step S 7 it is determined in step S 19 whether the counter has counted down to the bottom. In the affirmative case, packet transmission is carried out in the step S 20, and in the step S 21, it is determined whether the transmission was successful or not. If it is not successful the maximum value of the first time range, the value 52 of FIG. 2 is increased by 1 for the realtime traffic. When comparing this to step S 10 for the non-realtime traffic it can be deduced that the increase of the upper limit for realtime traffic is much smaller than for non-realtime traffic. Again, it is checked in step S 23 whether the maximum value 52 is larger than the upper limit. The upper limit could be pre-stored in the communication device for different traffic priorities. If yes, the transmission ends in step S 24, if not, the system returns to step S 16.

FIG. 4 describes a method carried out by a control node that determines or adapts the different time ranges shown in FIG. 2 and informs the connected communication devices accordingly. The method starts in step S 40. In step S 41, the first time range is determined and in step S 42, the second time range is determined. The first time range and the second time range are determined such that they do not overlap and that preferably guard slots are provided between the maximum value of the first time range and the minimum value of the second time range. The control node 100 can then inform the communication devices 200 in step S 43 about the different time ranges to be used. As discussed above in connection with FIG. 3, the communication device can then use different time ranges for the transmission of data packet streams with different priorities. The data packet stream with the higher priority can be a realtime data packet stream whereas the data packet stream with the lower priority can be a non-realtime data packet stream. However, it should be understood that both data packet streams can be non-realtime data packet streams whereas one has a higher priority or lower latency than another non-realtime data packet stream. Thus, the first data packet stream has not necessarily to be a realtime data packet stream.

The method of FIG. 4 ends in step S 44.

In connection with FIG. 5, it is disclosed how a transmission window and the maximum transmit opportunity is adapted in dependence on the realtime traffic requirements. The method starts in step S 50 and in step S 51 the realtime traffic requirements are determined. Generally, there is a dedicated field in the data frame, which indicates the traffic priority level. In some cases, the traffic priority is determined by the node itself generating the traffic. In other words, it can be inferred from the address field. By way of example, if a safety sensor is generating a traffic or the automation controller is generating traffic, it can have a mapping to realtime traffic. Based on the realtime traffic requirements, the maximum transmission time for a non-realtime traffic can be adapted. By way of example, when a transmission of a data stream with a high priority is detected, the maximum transmission time TXOP/transmission window can be shortened for a non-realtime traffic so that if a transmission of non-realtime traffic takes place, the maximum time the non-realtime traffic occupies the channel as shortened. In step S 53 the different communication devices attached to the control node are informed of the shortened maximum transmission time. The method ends in step S 54. The maximum transmission time (TXOP) is selected based on the most stringent traffic requirements. In general, all the nodes associated with a central node are notified of this duration. Therefore, when a particular node transmits non-realtime traffic, it has to abide by the TXOP already notified by the central node. Of course, at run-time the central node notifies all the nodes associated with it when the TXOP duration value is needed to be updated. Afterward, the associated nodes use the specified/updated TXOP value.

In the case when a node is in the process of transmitting a non-realtime traffic stream and a realtime traffic, is generated locally at the node, it can perhaps shorten/halt the non-realtime traffic transmission time in order to prioritize the medium access for realtime traffic. Regardless of this type of further optimization, the non-realtime traffic cannot take longer air-time than TXOP and thus realtime traffic requirements will still be satisfied.

Figure 6:
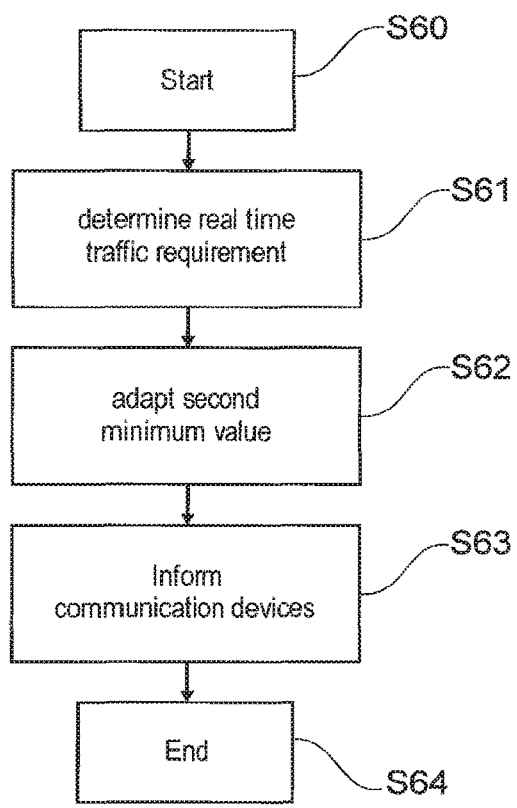
FIG. 6 shows an example of a flowchart of a method carried out at a control node for adapting a minimum time interval being used for the transmission of data streams with a lower priority based on traffic requirements of data streams with a higher priority.

In connection with FIG. 6 it is disclosed how a control node can adapt the transmission windows for non-realtime traffic in dependence on the realtime traffic needs. The method starts in step S 60 and in step S 61 the control node determines the realtime traffic requirements. The realtime traffic requirements can be determined based on information received from the different communication devices 200. By way of example each traffic can have a certain priority indicator and based on the priority indicator the control node can determine whether it is a realtime traffic or a non-realtime traffic and for the non-realtime traffic which priority the non-realtime traffic has. By way of example, when a new realtime traffic with a low latency is received at the control node, the control node can adapt the transmission window counter for the non-realtime traffic in step S 62. By way of example, the minimum value of the non-realtime traffic value 61 of FIG. 2 can be increased so that the devices transmitting non-realtime traffic have to wait for a longer time before transmission is started. In summary, the second time range is adapted. Thus, a higher probability exists that the communication device which is to transmit the high priority traffic can access the communication channel. In step S 63, the different communication devices attached to the control node or access node are informed accordingly of the adapted time ranges in which the transmission counter can be selected.

Figure 7:
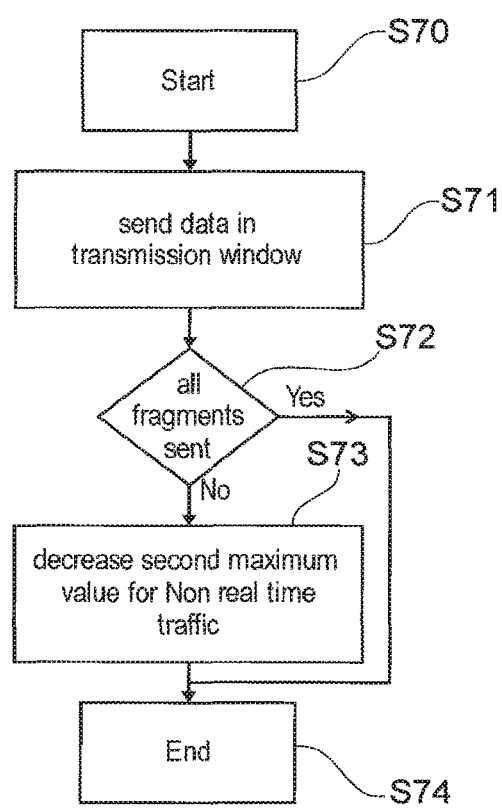
FIG. 7 shows an example of a flowchart of a method carried out by a communication device when it is determined that not al fragments of a data package can be transmitted within one transmission window.

In connection with FIG. 7 a flowchart is shown explaining the steps carried out by a communication device when transmitting the different data packets. The method starts in step S 70. When the communication device starts to transmit data the fragments of a data packet are transmitted in the transmission window in step S 71. In step S 72 it is then checked whether all the fragments belonging to the same data packet could all be transmitted within the maximum transmission window. If this is not the case, the communication device can decrease the maximum value of the time range for the non-realtime traffic is step S 73. Accordingly, the subsequent fragments of the same data packet are transmitted with a higher priority as the counter can only select from a time interval that is shortened so that the communication device which did not transmit al the fragments will access the shared communication channel earlier than other communication devices transmitting fragments of data packets having the same priority level. The method ends in step S 74.

FIG. 7 has been discussed in connection with non-realtime traffic as data packet of non-realtime packet may be larger than data packet of realtime traffic. However, it should be understood that also data packets of realtime traffic can be larger than the maximum transmission window so that the method of FIG. 7 can also be applied to realtime data packets.

Figure 8:
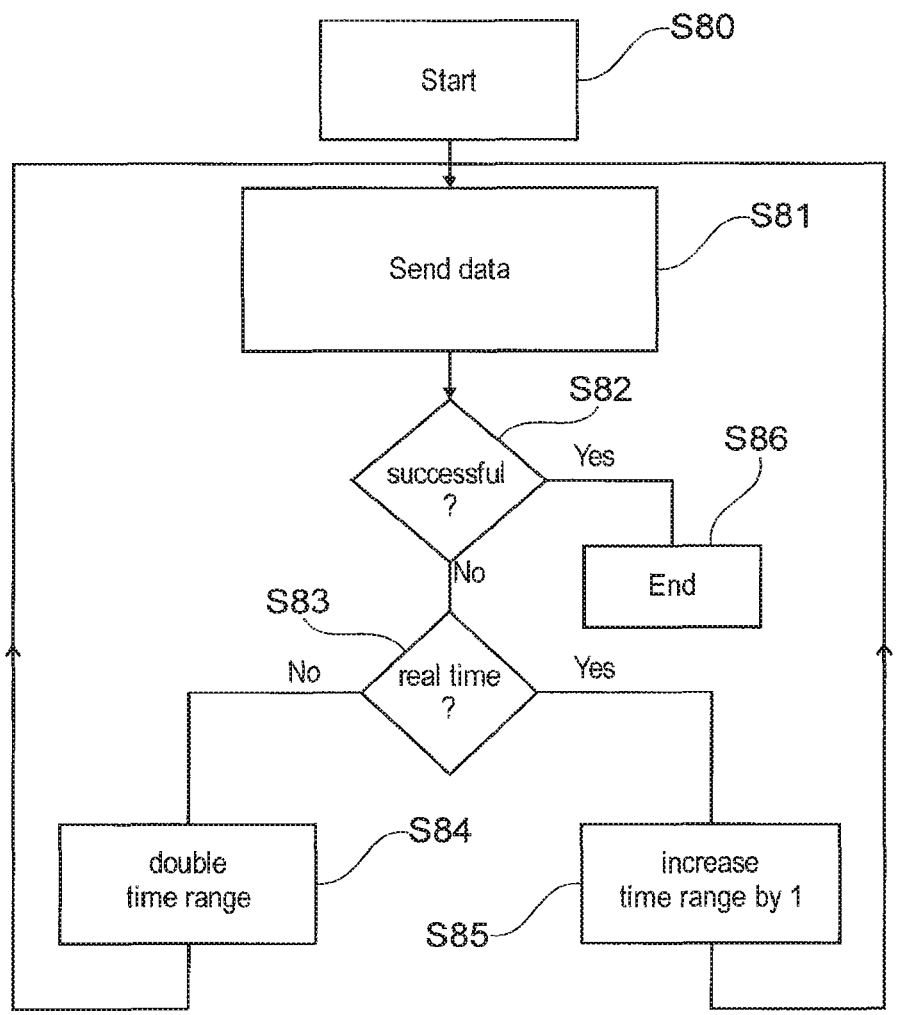
FIG. 8 shows an example of a flowchart of a method carried out at a communication device when a communication was not successful.

In connection with FIG. 8 it is explained how a communication device adapts an upper value of a time range for the contention window counter when the transmission was not successful. The method starts in step S 80 and a data packet is sent in step S 81. In step S 82, it is checked whether the transmission was successful, e.g. by waiting for an acknowledgement from the receiving side. If the transmission was not successful it will be transmitted in a subsequent attempt provided that the retransmission counts have not exceeded a certain maximum value. The situation then depends on the fact whether the transmission is a transmission of realtime data or non-realtime data (step S 83). If it is a non-realtime data, the maximum value of the time range is doubled for non-realtime traffic in step S 84 when the allowable maximum value has not been reached. This is done to resolve the contention in the medium. Often unsuccessful transmissions are caused by packet collisions in contention based systems and relieving contention situation helps in improving the transmission reliability. If it is however a realtime transmission, the maximum value is only increased by one time slot in step S 85. The smaller increase for the realtime traffic helps to avoid that the first time range and the second time range will overlap in case of an unsuccessful transmission. Moreover, longer waiting time in contention resolution for the realtime traffic is not desirable. If the transmission is finally successful, the method ends in step S 86. Please note that the increase of the ranges only occur if the upper limit further increased range is below a certain specified maximum possible value corresponding to the different traffic types. Moreover, longer waiting time in contention resolution for the realtime traffic is not desirable.

Figure 9:
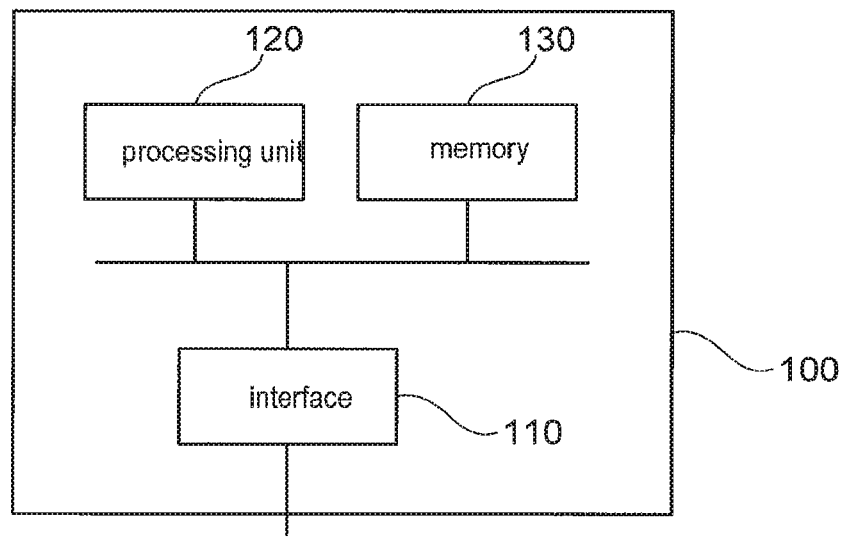
FIG. 9 illustrates an example architectural view of a control node controlling the access of communication devices to a shared communication channel.
Figure 10:
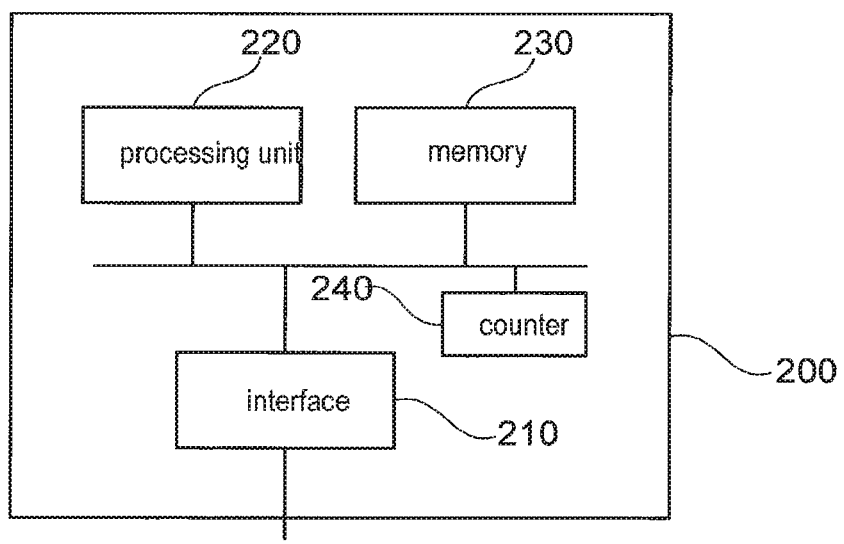
FIG. 10 shows an example architectural view of a communication device transmitting data package streams over a shared communication channel with different priorities.

FIGS. 9 and 10 show a schematic architectural view of a control node 100 and of a communication device 200 respectively. The control node 100 controlling the access to the shared communication channel comprises an interface 110. The interface is provided for transmitting user data or control messages to other entities and to receive data and control messages from other entities. The interface is especially qualified to receive the data packet streams from the different communication entitles 200 and to further transmit the data on the shared communication channel 50.

The interface 110 is furthermore configured for a wireless data exchange and for a wired data exchange. By way of example, the shared communication channel can be transmitted over a wire connection to another node of a wide area network (WAN) such as the internet. Furthermore, a processing unit 120 is provided which is responsible for the operation of the control unit. The processing unit 120 comprising one or more processors can carry out instructions stored on a memory 130 wherein the memory may include a read-only memory, a random access memory, a mass storage or the like. The memory can furthermore include suitable program code to be executed by the processing unit so as to implement the above described functionalities of the control node 100.

The communication device 200 shown in FIG. 10 comprises an interface 210 configured for the communication with other nodes or entities such as the control node 100 or any other nodes of a mobile communication system. An interface 210 is configured to exchange control messages and user data. A processing unit 220 is provided comprising one or more processors wherein the processing unit 220 is responsible for the operation of the communication device 200. A memory 230 is provided which can include a read-only memory, a random access memory, a mass storage or the like. Memory 230 can include suitably configured program codes to be executed by the processing unit 220 so as to implement the above described functionalities in which the communication device 200 is involved. Furthermore a counter 240 is shown, the counter 240 representing the contention window counter used for the transmission of data in FIG. 2. There could be multiple counters corresponding to different traffic classes.

It should be noted that the structures illustrated in FIGS. 9 and 10 are really schematic and that they may comprise further functional entities, which, for the sake of clarity, have not been illustrated.

From the above discussion some general aspects may be deduced. As discussed in connection with FIG. 2 a first time range 50 is defined by the first minimum value 51 and the first maximum value 52 and the second time range is defined by the second minimum value 61 and the second maximum value 62 wherein the first maximum value 52 is smaller than the second minimum value 61 so that the time ranges do not overlap.

The first and the second time range are counted in terms of time slots and the first maximum value 52 and the second minimum value 61 are such that a number of x guard time slots is provided between the first maximum value 52 and the second minimum value 61 with x being an integer greater or equal than 1. The guard time slots can help to maintain the non-overlapping time ranges even when the first time range and/or the second time range are adapted.

The data streams can be transmitted as data packet streams with data packet being transmitted in at least one fragment of a data packet. Furthermore, the communication devices is granted access to the shared communication channel for a time period of a transmission window. If even it is determined that fragments belonging to the same data packet cannot be transmitted within the same transmission window, the maximum value of the corresponding time range within which the time interval is selected, is reduced.

Furthermore, when an unsuccessful transmission is detected by a communication device, the first maximum value of the first time range can be increased for the first data stream and the second maximum value of the second time range can be increased for the second data stream wherein the second maximum value is increased by more time slots than the first maximum value of the first data stream. As discussed above, the first maximum value of the first time range may be increased by one time slot whereas a second maximum value of the second time slot may by doubled.

Furthermore, it is possible that changes of the first time range and/or the second time range are received from the control node which controls the communication over the shared communication channel.

As far as the control node is concerned, the control node may determine a contention level for the first data stream to be transmitted by the plurality of communication devices. Based on the determined contention level, the control node can then adapt the second minimum value of the second time range. By way of example, if the contention level for the first data stream is higher than a first threshold, e.g. If a very urgent data stream transmission is detected the second minimum value of the second time range can be increased so that communication devices transmitting data streams of a lower priority less often access the shared communication channel. Furthermore, as mentioned above, the control node may adapt the second time period of the transmission window in dependence of the data stream requirements for the realtime data traffic. In this context, when the data stream requirements of the first data stream are realtime traffic changes, the second time period is adapted and the information about the time period is transmitted to the communication devices.

Furthermore, the invention provides an apparatus such as a control node or a communication device comprising a processing unit and a memory containing instructions executable by the processing unit, whereby the apparatus is operative to carry out the different steps mentioned above.

Furthermore, an apparatus comprising means adapted to carry out the above mentioned steps is provided. The above described invention allows applications such as wireless automation applications to flexibly handle both realtime and non-realtime traffic patterns without compromising the timing constraints associated with realtime traffic.

The maximum transmit duration of the transmission window can be reconfigured according to the timing constraint imposed by the most stringent realtime traffic. This allows sufficient utilization of channel resources for non-realtime traffic while satisfying the time limits constraints of realtime traffic.

The priority management scheme allows fragments of the same data packet a higher channel access probability over data fragments of the same traffic type generated in a later time. Furthermore, reconfiguration of contention window parameters is allowed based on both the time constraint and contention level in the network which leads to a better channel access and lower collision likelihood as compared by way of example to Wi-Fi systems. The real configurable limits also allow having a guard interval between the maximum current contention window limit for realtime traffic and the minimum current contention window limit for non-realtime traffic so as to rule out the possibility of choosing the same contention window counter for both realtime and non-realtime traffic.

The invention claimed is:

1. A method for accessing, by a communication device, a shared communication channel in which contention based access to the communication channel is used, the communication device being configured to transmit data streams with different transmission priorities via the shared communication channel with a first data stream having a higher transmission priority than a second data stream, comprising:
observing whether the shared communication channel is available for transmission, wherein when the shared communication channel is available for transmission, and
the communication device waits for the duration of a time interval randomly selected from a time range in which the shared communication channel is available for transmission before the transmission is started, wherein a first time interval is selected from a first time range for the transmission of the first data stream, and a second time interval is selected from a second time range for the transmission of the second data stream wherein the second time range does not overlap with the first time range,
wherein the first time range is defined by a first minimum value and a first maximum value and the second time range is defined by a second minimum value and a second maximum value, wherein the first maximum value is smaller than the second minimum value,
wherein the first and second data streams are data packet streams with a data packet being transmitted in at least one fragment of the data packet, wherein the communication device is granted access to the shared communication channel for a time period of a transmission window, and
wherein based on determining that the fragments belonging to the same data packet cannot be transmitted within the transmission window, the maximum value of the corresponding time range within which the time interval is selected is reduced.

2. The method according to claim 1, wherein the first and the second time range are counted in terms of time slots, wherein the first maximum value and the second minimum value are such that a number of x guard time slots is provided between the first maximum value and the second minimum value, with x being an integer greater or equal than 1.

3. The method according to claim 1, wherein the first time range and the second time range are counted in terms of time slots, wherein when an unsuccessful transmission on the shared communication channel is detected due to data streams from another communication device, the first maximum value of the first time range is increased for the first data stream, and the second maximum value of the second time range is increased for the second data stream, wherein the second maximum value of the second data stream is increased by more time slots than the first maximum value of the first data stream.

4. The method according to claim 3, wherein the first maximum value of the first time range is increased by one time slot, whereas the second maximum value of the second time range is doubled.

5. The method according to claim 1, wherein the first data stream is a real time data stream and the second data stream is a non-real time data stream.

6. The method according to claim 1, wherein changes of first time range and the second time range are received from a control node controlling the communication over the shared communication channel.

7. The method according to claim 1, wherein the first time range and the second time range are received from a control node controlling the communication over the shared communication channel during runtime as a new first time range and a new second time range replacing a former first time range and a former second time range present at the communication device.

8. A communication device configured to access a shared communication channel in which contention based access to the communication channel is used, comprising:
an interface being configured to transmit data streams with different transmission priorities via the shared communication channel with a first data stream having a higher transmission priority than a second data stream, and
at least one processing unit configured to observe whether the shared communication channel is available for transmission, wherein when the shared communication channel is available for transmission, the processing unit is configured:
to wait for the duration of a time interval randomly selected from a time range in which the shared communication channel is available for transmission before the transmission is started, and
to select a first time interval from a first time range for the transmission of the first data stream, and to select a second time interval from a second time range for the transmission of the second data stream wherein the second time range does not overlap with the first time range;
wherein the first and second data streams are data packet streams with a data packet being transmitted in at least one fragment of the data packet, wherein the communication device is granted access to the shared communication channel for a time period of a transmission window, wherein if the at least one processing unit determines that fragments belonging to the same data packet cannot be transmitted within the transmission window, the at least one processing unit reduces the maximum value of the corresponding time range within which the time interval is selected.

9. The communication device according to claim 8, wherein the first time range is defined by a first minimum value and a first maximum value and the second time range is defined by a second minimum value and a second maximum value, wherein the at least one processing unit is configured to select the first maximum value and the second minimum value such that the first maximum value is smaller than the second minimum value.

10. The communication device according to claim 8, wherein the first time range and the second time range are counted in terms of time slots, wherein when the at least one processing unit detects an unsuccessful transmission on the shared communication channel, it the at least one processing unit is configured to increase the first maximum value of the first time range for the first data stream, and to increase the second maximum value of the second time range for the second data stream by more time slots than the first maximum value of the first data stream.

11. The communication device according to claim 10, wherein the at least one processing unit is configured to increase the first maximum value of the first time range by one time slot, and to double the second maximum value of the second time range in case of an unsuccessful transmission.

12. The communication device according to claim 8, wherein the interface is configured to receive information about change of the first time range and the second time range from a control node controlling the communication over the shared communication channel.

* * * * *